MAGNETIC RECORDING OF A VARIABLE SLOPE PULSE MODULATED SIGNAL

Filed March 7, 1966

INVENTOR.
RUSSELL R. LAW,
BY
Robert Thompson
ATTORNEY

INVENTOR
RUSSELL R. LAW,
BY
Robert Thompson
ATTORNEY

INVENTOR.
RUSSELL R. LAW,
BY
Robert Thompson
ATTORNEY

INVENTOR.
RUSSELL R. LAW,
BY
Robert Thompson
ATTORNEY 3,449,757

MAGNETIC RECORDING OF A VARIABLE SLOPE PULSE MODULATED SIGNAL

Russell R. Law, Malibu, Calif., assignor to Hughes Aircraft Company, Culver City, Calif., a corporation of Delaware Filed Mar. 7, 1966, Ser. No. 532,253
Int. Cl. G01d *15/12*
U.S. Cl. 346—74 4 Claims

ABSTRACT OF THE DISCLOSURE

A magnetic recording circuit having a recording amplifier which converts a received amplitude signal of an AM pulse train for periodic input signals to ramp function pulses having slopes or constant rates of *dv/dt* which are proportional to the instantaneous amplitude V of a corresponding input signal. The ramp function signals which occur at a constant pulse repetition rate are applied to a magnetic recording head which generates a magnetizing force H which is proportional to the corresponding ramp function. Magnetizing force H is applied to a magnetic medium of a magnetic tape in accordance with the magnetic transfer characteristics of the recording head and magnetic medium.

This invention relates generally to magnetic recording and particularly to improvements in the magnetic recording of broad bandwidth AM (amplitude modulated) signals, such as television video signals on magnetic tape, and reproducing the recorded signals.

In the field of magnetic recording, the quality of the recording depends upon many factors. For example, the frequency response or storage density limitations of the recording medium may not be the same for all frequencies within a given bandwidth. That is, a thick magnetic medium may record relatively low frequency signals best, whereas, a thin magnetic medium may record relatively high frequency signals best. In addition, the magnetic medium and the tape may have certain magnetic and physical irregularities, such as nonhomogeneous distribution of magnetic domain and nonuniform thickness. Also, the tape speed of the tape recorder may be subject to slight variations. These factors can be coupled with the fact that magnetic recording heads can have bandpass limitations because of iron losses, stray capacitance and inductance, or physical limitations on the gap width. These factors have to be taken into consideration when broad bandwidth signals, such as television video signals, are to be recorded.

Accordingly, it is an object of this invention to provide a means and method for recording broad bandwidth signals on a magnetic recording medium while easing the time-base-stability requirements for intelligibly reproducing the information.

Another object is to provide improvements in magnetic recording which reduce the physical and operational limitations of the recording system and recording medium.

Still another object is to provide an improved method for recording a high-density AM signal on a magnetic recording medium while more fully utilizing the information storage density capabilities of the magnetic medium.

Yet another object is to provide improvements in the recording of the AM television video signals.

The above and other objectives of this invention may be attained by providing a magnetic recording circuit having a recording amplifier which converts the amplitudes of an AM pulse train or periodic input signal to ramp function pulses having slopes or constant rates of change *dv/dt*, which are proportional to the instantaneous amplitude V of a corresponding input signal. These ramp function signals which occur at a constant pulse repetition rate, are applied to a magnetic recording head which generates a magnetizing force H which is proportional to the corresponding ramp function. This magnetizing force H is applied to magnetize the magnetic medium of a magnetic recording tape in accordance with the magnetic transfer characteristics of the recording head and magnetic medium, as represented by a hysteresis loop curve.

In order to obviate problems created by the remanent magnetization properties of the magnetic material, an AC bias can be used to normalize the magnetization curve. Alternatively, a DC recording technique can be used in which each bit of recorded information is preceded or followed by a precursor pulse which carries the magnetization through the knee of the hysteresis curve to the saturation point—first in one direction for one bit of information, and then in the opposite direction for the next bit of information. Consequently, when the magnetizing force H returns to zero, the remanent magnetization is always at one or the other of the two possible retentivity levels.

The recorded information may be reproduced by moving the magnetic recording medium relative to a reproduce head and circuit whereby the recorded, constantly increasing rate or ramp function signals *dB/dt*, are fed to a playback amplifier which converts the played-back signal pulses to AM pulses which have an amplitude proportional to the slope of the corresponding recorded signal. By sampling these played-back AM pulse train signals, at or near the center of the pulse duration pulse, it is possible to effectively eliminate the erroneous signal and transient responses which are inherent at the leading edge and at the training edge of the played-back signal.

Other objects, features, and advantages of this invention will become apparent upon reading the following detailed descrpition of several embodiments and referring to the accompanying drawings, in which.

Figure 3:
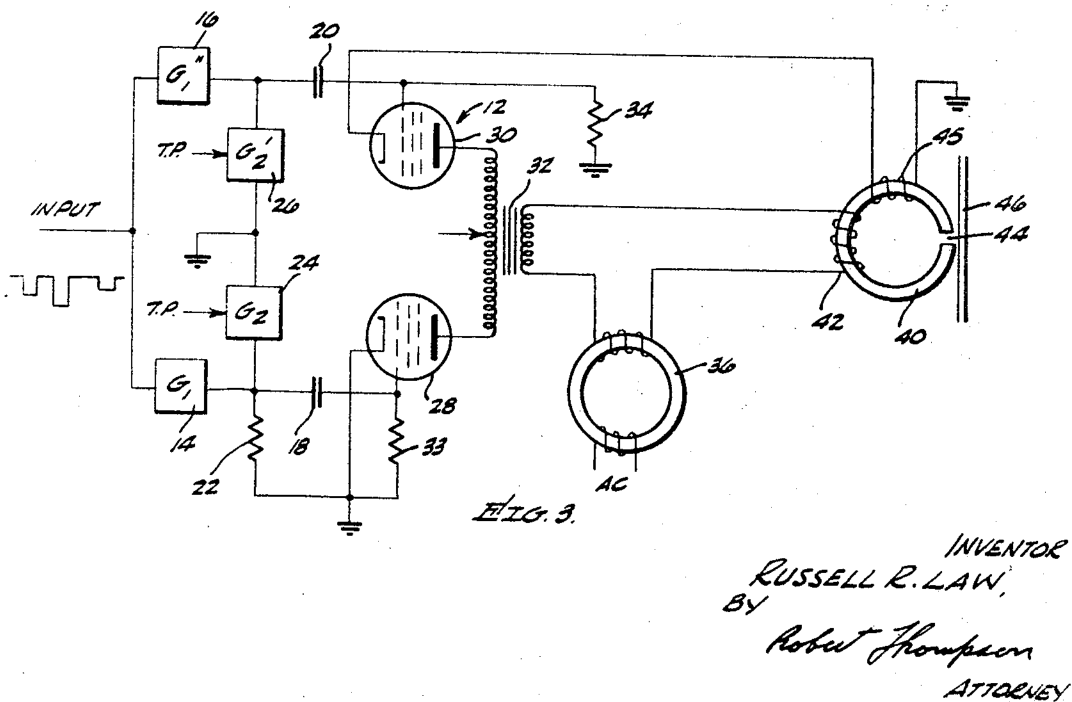
FIG. 3 is a circuit diagram of one embodiment of a recording circuit in which the magnetic portions thereof are subjected to an AC bias to obtain the normalized hysteresis curve of FIG. 2.
Figure 6:
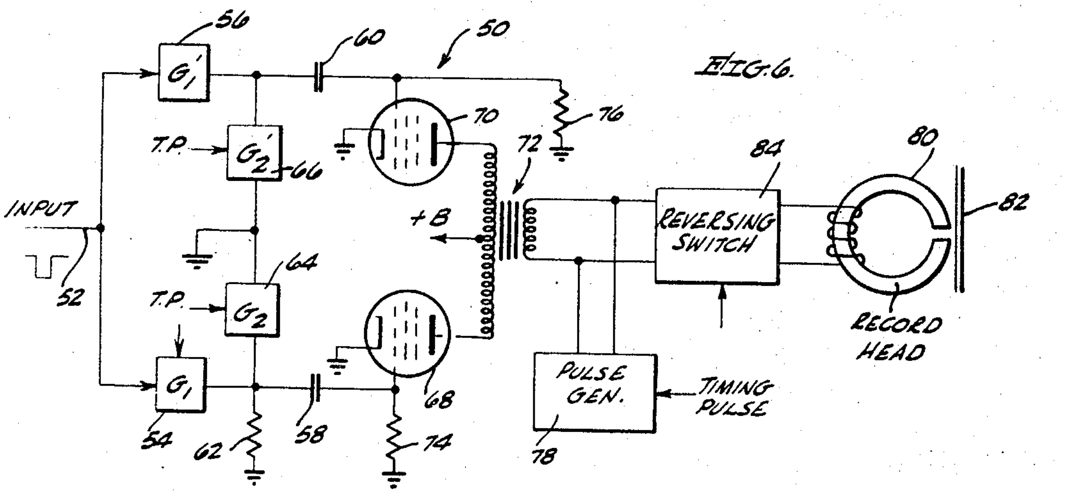
Figure 5:
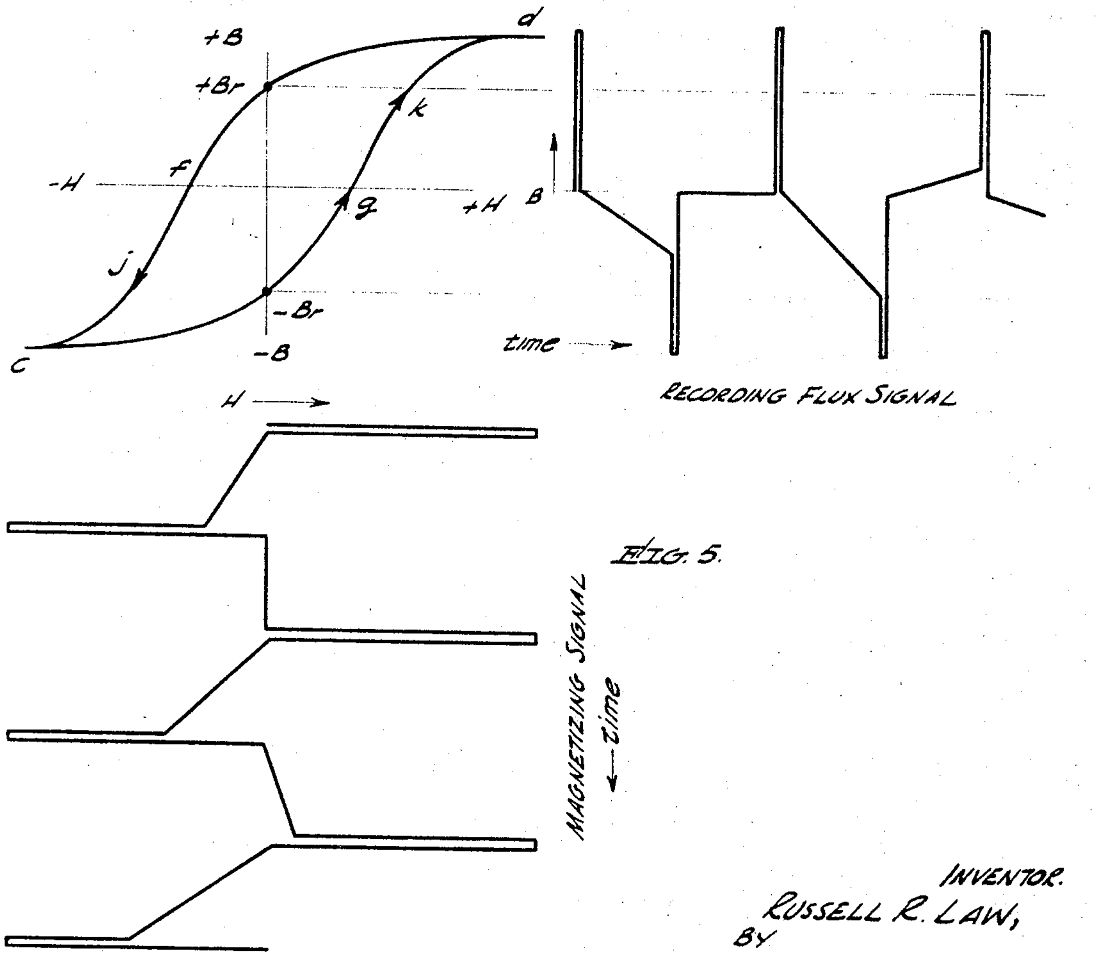
Figure 7:
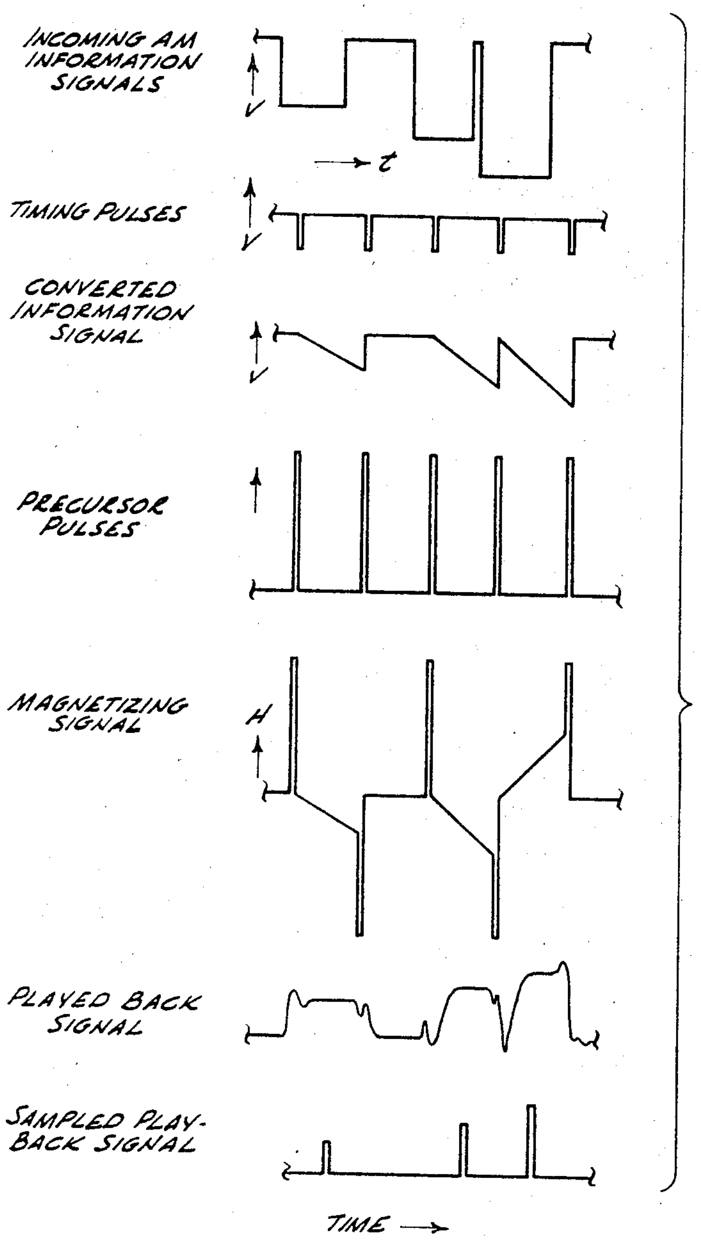

FIGS. 4*a*–4*f* are graphs illustrating the waveforms of signals generated within the recording circuits of FIG. 3;

FIG. 5 is a graph representing the hysteresis loop characteristics inherent in the operation of a second embodiment wherein the magnetization of the recording medium is alternately driven to a first saturation level and then to the second saturation level by precursor pulses and every other converted information pulse is inverted;

FIG. 6 is a circuit diagram of one recording circuit that will record the information in accordance with the operating characteristics of the hysteresis loop of FIG. 5; and FIG. 7 is a graphical representation of the waveforms or signals generated within the recording circuit of FIG. 5 and is considered simultaneously therewith.

Figure 1:
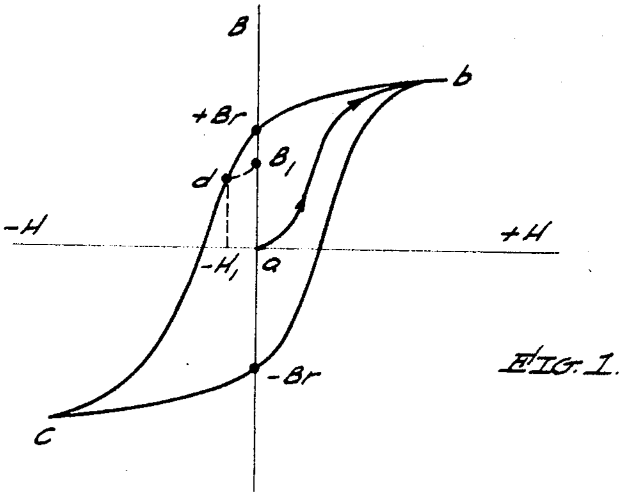
FIG. 1 is a graph representing typical magnetic hysteresis loop characteristics of the magnetic portion of a typical recording circuit.

Referring to the drawings, by way of background, the magnetic recording medium used in recording heads and magnetic tapes generally is a soft, ferromagnetic material having magnetization and transfer characteristics which can be represented by the hysteresis loop curve graphically illustrated in FIG. 1. In operation, a magnetizing force +H applied to a magnetic medium having no previous magnetic history will induce a magnetic field +B in the magnetic medium which increases from point *a* of the *B—H* curve in FIG. 1, through a relatively linear portion, to a saturation point *b*. When the magnetizing force +H is reduced to zero, the remanence of the magnetic medium is such that the magnetization level will not return to zero but will instead go at a retentivity level $+B_r$, which is a maximum positive value of remanence which a magnetic medium can display. A negative magnetizing force —H applied to the magnetic medium will drive it from the positive retentivity level $+B_r$ to a negative saturation point *c* along the hysteresis loop curve. Thereafter, when the magnetizing force —H is reduced to zero, the induced field in the magnetic medium does not drop back to zero but goes to a negative retentivity level $-B_r$ along the hysteresis curve. A positive magnetizing force +H can again be applied to the magnetic medium driving the induced magnetic field B from the retentivity level $-B_r$ to the saturation point *b* along the hysteresis loop curve, whereafter the above-described operation can be repeated.

In addition to permeability and remanence, the magntic medium has a coercivity characteristic which is a measure of the magnetizing force with which a magnetized material resists demagnetization. For example, if the magnetic medium were at the retentivity level $+B_r$ and a magnetizing field $-H_1$ were applied to it, the induced magnetic field would go to point *d*. If, thereafter, the magnetizing field $-H_1$ were reduced to zero, the induced magnetic field would not return to the retentivity level $B_r$ but to a lower remanence level $B_1$. Consequently, the remanent magnetization of the material cannot be readily predicted.

One way to obviate these operating characteristics is to subject the magnetic medium to a conventional AC bias which, in effect, normalizes the hysteresis loop to form a minor hysteresis loop which is ideally, a single line. This normalized *B—H* curve is represented by the solid-line curve *bac* located within the dotted line major hysteresis loop of FIG. 2.

In recording information by one method incorporating the features of this invention, a series of AM pulse signals can be converted to a series of ramp function pulse signals in which each ramp function signal has a slope or leading edge that increases at a constant rate $dv/dt$ proportional to the amplitude V of a corresponding AM input pulse.

The corresponding recording signals, as will be explained in more detail shortly, have slopes $dH/dt$ corresponding to the signals $dv/dt$ and induce a magnetic field $dB/dt$ within the recording medium of the magnetic tape in accordance with the transfer characteristics of the normalized *B—H* curve of FIG. 2.

Figures 4A, 4B, 4C, 4D, 4E, 4F:
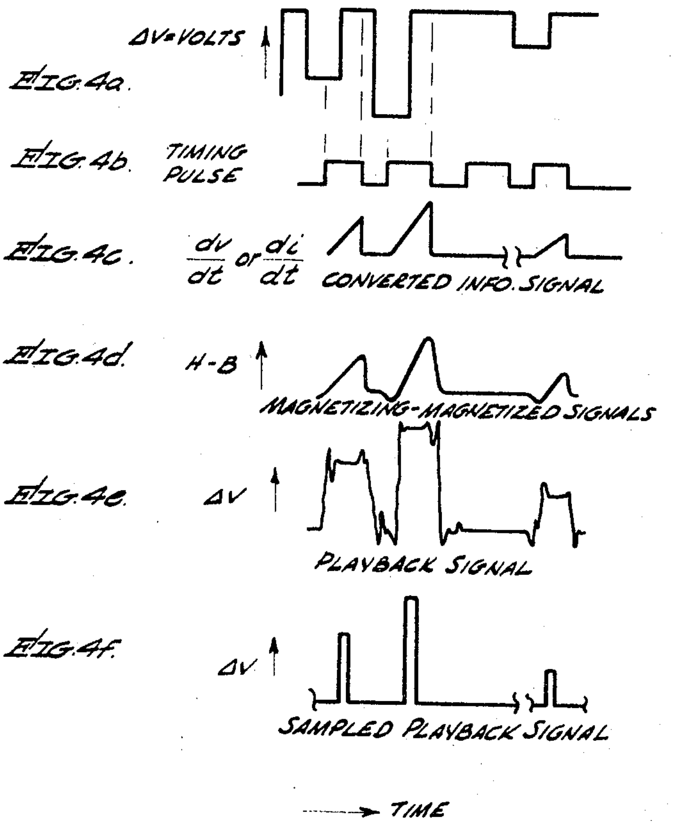

For example, the AM pulse train graphically illustrated in FIG. 4*a* can be converted by the recording circuit illustrated in FIG. 3 to the above-described magnetization recording signal (FIG. 2 and FIG. 4*d*) having the ramp function waveform. Structurally, the recording circuit includes a push-pull amplifier circuit 12 which receives the negative going AM information pulse signals from the input terminal. These incoming information signals are divided between two parallel circuit branches and are sampled, for a short time, during the relatively flat pulse duration thereof by sampling gates 14 and 16. The sampling gates 14 and 16 can be activated simultaneously by the timing pulse signal (FIG. 4*b*) and are of the type described and illustrated in my U.S. Patent No. 3,372,228, filed May 21, 1965 entitled "Television Signal Recorder."

The sampled AM information signals from sampling gate 14 and from sampling gate 16 are applied simultaneously to storage capacitors 18 and 20, respectively. In choosing the values of these capacitors, it is necessary to make them sufficiently large so that they will be substantially charged within the short duration of the sampled pulses. The storage capacitor 18 has a discharge resistor 22 connected to the input terminal end thereof. In operation, the capacitor 18 and the resistor 22 form an RC charging circuit in which the charge on the capacitor 18 discharges through the resistor 22 to a common terminal at a sufficient rate during the pulse spacing between sampled pulses so that the rate of discharge is substantially linear. In effect, the RC time constant of capacitor 18 and resistor 22 is sufficiently large so that its operation remains substantially in the linear portion thereof until the capacitor 18 is subsequently discharged to a common terminal through a shorting gate 24. The shorting gate circuit 24 can be closed to the common or ground terminal by the portion of the timing signal pulses between the trailing edge of one pulse and the leading edge of a subsequent timing pulse.

As previously stated, the storage capacitor 20 is also electrically charged at the same time that the capacitor 18 is charged. The storage capacitor 20, however, does not form a portion of an RC charging circuit since there is no resistor through which any electrical charge may be discharged to the common terminal at an appropriate rate. Thus, the charge of the capacitor 20 and the voltage at its output terminal remains substantially constant during the time that the capacitor 18 is being discharged. However, at the end of the timing pulse the capacitor 20 is also discharged to a common terminal through a shorting gate 26.

The voltage signals on the output terminals of capacitor 18 and capacitor 20 are applied to control the operation of two pentodes 28 and 30 respectively.

The pentodes 28 and 30 are balanced and matched so that the DC current component developed when the capacitors 18 and 20 are initially charged are self-cancelling. Thus, only the linear ramp function signal resulting from the change in grid voltage at the output terminal of capacitor 18, as a result of discharge through resistor 22, produces a corresponding ramp function waveform current change in the primary winding of an output transformer 32. Structurally, the outputs of capacitors 18 and 20 are coupled to control grid input terminals of pentodes 28 and 30, respectively at the junction of the high resistance grid resistors 33 and 34, respectively.

Figure 2:
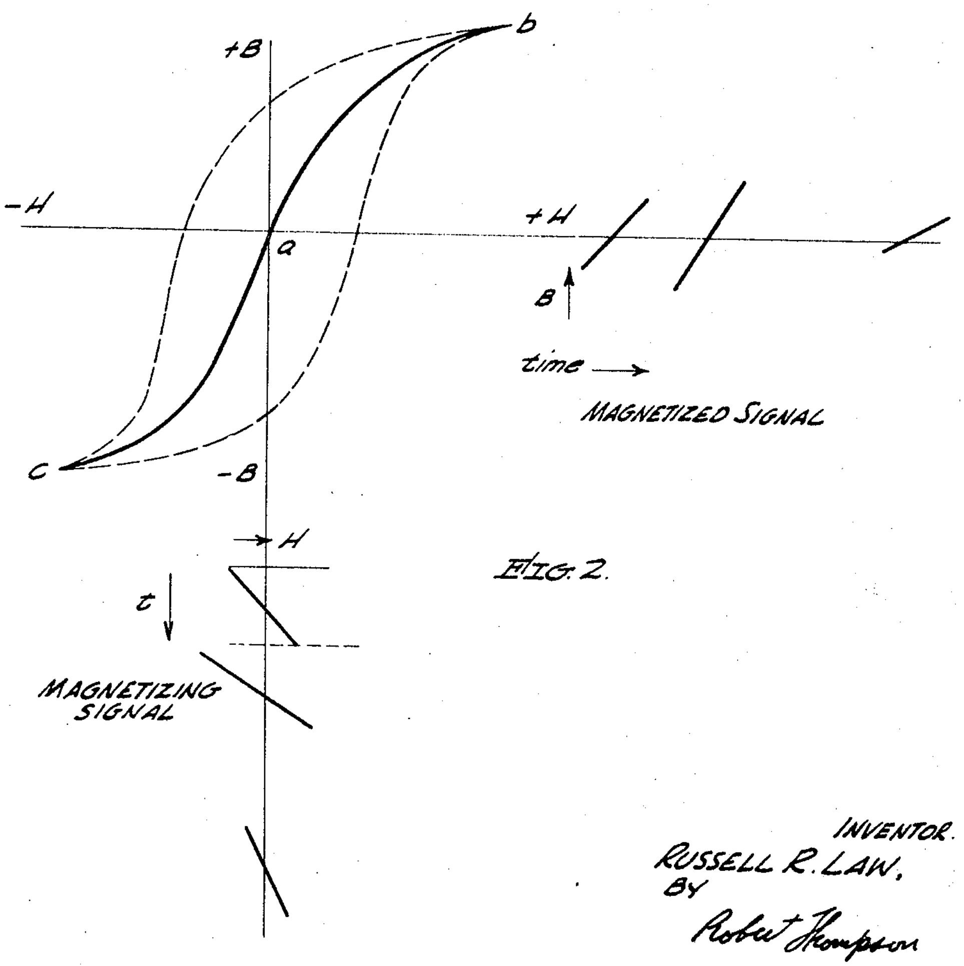
FIG. 2 is a graph representing the normalized hysteresis curve resulting from an AC biasing of the magnetic portions of a recording circuit and the effect of the normalized magnetic transfer characteristics on a converted information signal and the resulting recording flux.

The resulting current signal $di/dt$ induced in the secondary winding of transformer 32 is substantially identical to the ramp function voltage signal $dv/dt$ generated by the RC charging circuit, and has a slope substantially the same as the slope of the magnetizing signal illustrated in FIG. 2.

An AC bias signal $i\omega(t)$ is added to the ramp function current signal $di/dt$ by means of a transformer 36 coupled to one of the output lines from the secondary winding. In operation, an AC signal is applied to the primary windings of the transformer 36, inducing the AC current signal $i\omega(t)$ in the output lead which is coiled around a portion of the transformer core. The resulting current signal $i=di/dt+i\omega(t)$ is applied to a magnetic recording head 40.

The magnetic recording head 40 includes an input winding 42 coiled about a portion of a core. The incoming current signal $i=di/dt+i\omega(t)$ flowing through the winding 42 generates a magnetizing force H across the gap 44 corresponding to the current *i*. In effect, the magnetizing force H (FIG. 4(*d*)) also has a ramp function waveform with a slope $dH/dt$ that is proportional to the slope of the converted information signal $dv/dt$ (FIG. 4(*c*)).

In order to maintain the magnetizing force symmetrical about the center point of the normalized *B—H* curve of FIG. 2 for more linear operation, a bias winding 45 is coupled to the magnetic core of the recording head 40. In operation, the cathode current of pentode 30 DC biases or displaces the starting point on the normalized *B—H* curve an amount directly proportional to the magnitude of the charge on capacitor 20. Consequently, the ramp function magnetizing force signals $dH/dt$ always have the same center reference point for all amplitudes of information signals, whereat the central portions of the $B-H$ curve exhibits the most linear transfer characteristics.

As a result, the magnetizing force H applied to the magnetic recording medium of a magnetic tape 46 creates a magnetizing field $dH/dt$ which operates in the substantially linear transfer characteristics portion of the $B-H$ magnetization curve of FIG. 2. Consequently, the magnetic field B induced within the magnetic recording medium 46 is substantially identical to the magnetizing force H, as is more clearly represented by the normalized $B-H$ transfer function graph of FIG. 2.

Thus, referring back to FIG. 2, the incoming pulse train of magnetizing force signals $dH/dt$, which is generated across the recording head gap 44, induces corresponding magnetic fields B, which have a slope $dB/dt$, along the magnetic medium of recording tape 46 as the magnetic tape continuously moves or travels linearly relative to or past the gap 44. The slope $dB/dt$ of the magnetic field induced in the magnetic medium of tape 46 is proportional to the slope $dH/dt$ of the recording magnetizing force, except for a slight distortion resulting from some nonlinear transfer characteristics of the magnetic portions and materials. An advantage of recording at this single frequency, with the slope of the information signals representing the value of the information, is that an optimized frequency response can be selected for the recording head and magnetic recording medium.

After recording, the remanent magnetization of the recording medium will appear as a corresponding ramp function signal when subsequently run past a playback head.

To reproduce the recorded information, the magnetic tape 46 is continuously moved or run past a playback head which is coupled to playback circuit of the type described and illustrated in my previously referenced copending U.S. patent application. The playback head continuously scans the continuously moving or changing portions of the recording medium, detects the previously-recorded remanent magnetization, and converts the series of constant rate of increase or ramp function information pulses to a series of AM playback pulses, such as illustrated in FIG. 4(*e*). Although the leading edges and the trailing edges of these AM pulse signals most likely contain transient responses, suffer from time base instability and other extraneous signals, the central portion of the pulse table is at a relatively steady state and has an amplitude that is proportional to the slope of the corresponding played-back ramp function pulse.

To avoid erroneous information which could result from these transient responses, the played-back pulses are sampled for a short time interval during the relatively steady state portion at, or about, the central portion of the pulse duration. Thereafter, these sampled playback signals (FIG. 4(*f*)) which contain the reproduced amplitude information, and are equally spaced, can be stretched or lengthened so that they are compatible with a conventional television receiver.

In another embodiment, the AM signal can be recorded without resorting to the previously-described AC biasing of the recording medium. Instead, the magnetic medium is driven to one saturation level prior to a first information bit, to the second saturation level prior to the next information bit, back to the first saturation level prior to the third information bit, and so on, in the same alternating sequence. Consequently, the magnetizing force H and the magnetic field B induced in the recording medium always follow the transfer characteristics represented by a major hysteresis loop curve of the type illustrated in FIG. 5.

In examining FIG. 5 in greater detail, it can be seen that the second method of recording the AM pulse signals also includes the step of converting the AM pulses to a train of ramp function pulses, each of which have a slope $dv/dt$ that is related to the amplitude V of the corresponding AM pulse. In addition, every other converted ramp function pulse is inverted, whereupon, all of the odd numbered information pulses can only have a slope in one direction, and all of the even numbered information pulses can only have a slope in an opposite direction.

In operation, the transfer characteristics of the magnetics will follow the $B-H$ curve *dfc* for every other information pulse and will follow the $B-H$ curve *cgd* for every information pulse between every other pulse. In other words, the $B-H$ curve *dfc* can represent the transfer characteristics for the arbitrarily selected odd numbered pulses, and the $B-H$ curve *cgd* can represent the transfer characteristics for the arbitrarily selected even numbered pulses. Hereafter, the pulses which drive the magnetic medium to the saturation level *d* and *c* will also be referred to as precursor pulses since they, in effect, precede the information pulses.

By a proper selection of the operating parameters, it is possible to utilize only the relatively linear portion of the $B-H$ curve between the points $+B_r fj$ and $-B_r gk$. It should be understood, however, that the linear portion of the $B-H$ curve may be longer than or shorter than the portion defined by the arbitrarily selected points, and that these points have been selected merely for descriptive purposes. In this regard, a constant magnetic bias would be needed to initiate the transfer from some point other than the retentivity levels $+B_r$ and $-B_r$.

A recording circuit that could perform the above-described operation is illustrated in FIG. 6, the operation of which can be understood with reference to the graphic waveforms of electrical signals generated therein which are illustrated in FIG. 7. The recording circuit includes a push-pull amplifier circuit 50 which receives the negative going AM information signals on input terminal 52. These AM information signals are divided between two parallel circuit branches and are sampled, for a short duration, during the relatively flat table portion thereof by sampling gates 54, and 56. The sampling gates 54 and 56 can be activated simultaneously by the timing pulse signal (FIG. 7) and are of the type described and illustrated in my previously referenced U.S. patent.

The sampled AM information signals from sampling gate 54 and from sampling gate 56 are applied simultaneously to the storage capacitors 58 and 60, respectively. In choosing the values of these capacitors, it is necessary to make them sufficiently large so that they will be virtually fully charged within the short duration of the sampled pulses. The storage capacitor 58 has a discharge resistor 62 connected to the input terminal thereof. In operation, the capacitor 58 and the resistor 62 form an RC charging circuit in which the charge on the capacitor 58 discharges through the resistor 62 to a common terminal at a sufficient rate during an information pulse duration so that the rate of discharge is substantially linear. In effect, the RC time constant of capacitor 58 and reistor 62 is sufficiently large so that its operation remains substantially in the linear portion thereof until the capacitor 58 is discharged to ground through a shorting gate 64. The shorting gate circuit 64 can be closed to the common or ground terminal by the portion of the timing signal pulses between the trailing edge of one pulse and the leading edge of the next pulse.

As previously stated, the storage capacitor 60 is also electrically charged at the same time that the capacitor 58 is charged. The storage capacitor 58, however, does not form a portion of an RC charging circuit since there is no resistor through which the capacitor charge may be discharged to the common terminal at an appropriate rate. Thus, the charge of the capacitor 60 and the voltage at the output terminal remains substantially constant during the time that the capacitor 58 is being discharged. At the end of the timing pulse the capacitor 60 is also discharged to a common terminal through a shorting gate 66.

The voltage signals on the outputs of capacitor 58 and capacitor 60 are applied to control the operation of two pentodes 68 and 70.

The pentodes 68 and 70 are balanced and matched so that the DC current component developed when the capacitors 58 and 60 are initially charged are self-cancelling. Thus, only the linear ramp function signal resulting from the change in voltage at the output terminal of capacitor 58, as a result of discharge through resistor 62, produces a corresponding ramp function waveform current change in the primary winding of an output transformer 72. Structurally, the outputs of capacitors 58 and 60 are coupled to control grid input terminals of pentodes 68 and 70, respectively, which also include high resistance grid resistors 74 and 76, respectively.

The resulting current signal induced in the secondary winding of transformer 72 is substantially identical to the ramp function current signal generated by the RC charging circuit, and has a waveform substantially similar to the converted information signal illustrated in FIG. 7.

A precursor pulse is added to the leading edge (or trailing edge) of the converted information signals by means of a pulse generator 78 connected across the output lines of the secondary winding. The pulse generator 78 can be controlled by the portion of the timing pulses between the trailing edge of one pulse and the leading edge of the subsequent timing pulse. One circuit that will perform this operation is the astable multivibrator described and illustrated in G.E. Transistor Manual, 7th ed., pp. 200–201, Fig. 7.19.

In accordance with the recording method described with reference to FIG. 6, every other composite ramp function information signal and precursor pulse is inverted to form a recording signal H which is applied to a recording head 80 and magnetic recording medium 82. This alternate inverting operation is accomplished by a reversing switch 84 which is connected to receive the combined converted information signal and the precursor pulse signal and, in effect, forms the recording signal H having the waveform illustrated in FIG. 5 and FIG. 7. The reversing switch 84 can be alternately switched from a noninverting mode of operation to the inverting mode of operation by the portion of the timing pulses between the trailing edge of one timing pulse and the leading edge of the subsequent timing pulse, wherein the odd-numbered pulses are inverted relative to the even-numbered pulses. In other words, every other recording signal H is inverted relative to the others. As previously described, these recording signals are recorded on the magnetic medium 82 in accordance with the transfer characteristics of the $B-H$ curve of FIG. 5.

When the recorded information is reproduced, each recorded pulse signal generates a playback pulse signal which has an amplitude proportional to the rate of flux change generated by the recorded ramp function signal as it travels relative to a playback head. In effect, the greater the slope of the recorded signal, the greater will be the amplitude of the played-back signal. Since, however, the leading edges of the played-back signal may include transient responses and time base instability which could produce erroneous playback information, the more nearly linear or flat portions of the played-back signals near the center of the pulse table are sampled for a very short duration. Thereafter, the short duration sampled played-back pulse signals can be stretched or widened to make them more compatible with a television receiver.

While salient features have been illustrated and described with respect to particular embodiments, it should be readily apparent that modifications can be made within the spirit and the scope of the invention, and it is therefore not desired to limit the invention to the exact details shown and described.

What is claimed is:

1. A device for magnetically recording the amplitude information of a signal on a relatively moving magnetic recording medium comprising:
- means coupled to receive the amplitude information signal for converting the received signal to periodic ramp function signals each having a slope related to the periodic instantaneous amplitude of the received signal;
- magnetizing means responsive to the converted signal for generating ramp function magnetizing force signals each having a slope proportional to the slope of the corresponding converted information signals and being operable to magnetize along the relatively moving magnetic recording medium; and
- biasing means coupled to said magnetizing means for saturating said magnetizing means during the interval between the ramp function signals.

2. The device of claim 1 further including means coupled to invert every other ramp function signal, and said biasing means saturates said magnetizing means in an inverted direction during the interval between every other ramp function signal.

3. The device of claim 1 further including means coupled to invert every other ramp function magnetizing force signal.

4. The device of claim 1 in which said biasing means saturates said magnetizing means in an inverted direction durng the interval betwen every other ramp function signal.

References Cited

UNITED STATES PATENTS

| | | | |
|---|---|---|---|
| 2,419,547 | 4/1947 | Grieg | 179—15 |
| 2,515,452 | 7/1950 | Kaufman | 325—38 |
| 2,563,882 | 8/1951 | Stolaroff | 179—100.2 |
| 2,816,175 | 12/1957 | Blaney | 179—100.2 |
| 2,867,685 | 1/1959 | Johnson | 178—6.6 |

FOREIGN PATENTS 657,398 9/1951 Great Britain.

OTHER REFERENCES

Kruse, Olan E.: Variable Slope Pulse Modulation, Proceedings of the I.R.E., November 1952, p. 1604.

BERNARD KONICK, *Primary Examiner.*

LEE J. SCHROEDER, *Assistant Examiner.*

U.S. Cl. X.R.

178—6.6; 179—100.2; 332—1